United States Patent [19]

Siddoway

[11] 3,920,255

[45] Nov. 18, 1975

[54] LOAD CARRYING DEVICE

[76] Inventor: Richard D. Siddoway, 803 Claybourne Ave., Salt Lake City, Utah 84106

[22] Filed: Sept. 9, 1974

[21] Appl. No.: 504,136

[52] U.S. Cl................................ 280/5.26; 280/47.31
[51] Int. Cl.² .......................................... B62B 5/02
[58] Field of Search................ 280/5.26, 36 C, 47.31

[56] References Cited
UNITED STATES PATENTS

| | | | |
|---|---|---|---|
| 1,551,127 | 8/1925 | Whyel | 280/5.26 |
| 2,806,708 | 9/1957 | Finstad | 280/36 C |
| 3,235,281 | 2/1966 | Faucette | 280/47.31 |
| 3,269,741 | 8/1966 | Porcello | 280/5.26 |
| 3,497,228 | 2/1970 | Porcello | 280/5.26 |
| 3,788,659 | 1/1974 | Allen | 280/36 C |

FOREIGN PATENTS OR APPLICATIONS

| | | | |
|---|---|---|---|
| 811,457 | 1/1937 | France | 280/5.26 |
| 1,531,179 | 5/1968 | France | 280/5.26 |
| 537,389 | 2/1957 | Canada | 280/5.26 |
| 1,208,170 | 9/1959 | France | 280/5.26 |
| 1,032,136 | 6/1966 | United Kingdom | 280/5.26 |

*Primary Examiner*—Leo Friaglia
*Attorney, Agent, or Firm*—Trask & Britt

[57] ABSTRACT

A load carrying device for transporting loads over rugged terrain. A wheeled load carrying device having frame members attached at one end to a single axle and free at the opposite end for support by a person. Three wheels are rotatably attached to legs through which the single axle passes in connecting the wheel assembly to the frame members. Two of the wheels support the device upon a smooth terrain, while the third wheel is positioned above the main axle. The device is especially useful by hunters, campers, and the like for transporting supplies, animal carcasses and the like over very rugged terrain.

9 Claims, 4 Drawing Figures

LOAD CARRYING DEVICE

BACKGROUND OF INVENTION

Load carrying devices for use in rugged, rocky terrain have not been widely utilized. Hunters, for example, generally drag or carry as much of a large animal carcass as possible, or carry a whole carcass slung upon a pole suspended between two bearers.

Although various carriers have been developed for personal use, lightweight carriers for use in rugged terrain have not been readily available.

Typical of carriers developed for personal use are those described in U.S. Pat. Nos. 3,497,227 and 3,497,228 issued to Porcello. These carriers utilize at least a pair of revolving wheel holders which have three wheels per holder. These carriers are particularly adapted for wheeling loads up or down stairs.

DESCRIPTION OF INVENTION

A lightweight load carrying device for transporting loads over rugged terrain has now been invented. The device is especially useful for transporting loads of several hundred pounds or more by one person over rocky or uneven ground. The device enables one person to transport loads too heavy to be carried over terrain composed of logs, rocks, ditches, and like obstacles.

The novel load carrying device comprises a flat, tubular, load supporting frame with handle means at one end for support by a person and having attached at the opposite end thereof an axle which is a bearing surface for three or more legs supporting wheels at the end thereof. Its construction enables a person easily to pull heavy loads over rocks, logs and the like.

BRIEF DESCRIPTION OF THE DRAWINGS

Description of the device may be facilitated by reference to the following drawings.

DESCRIPTION OF THE PREFERRED EMBODIMENT

Figure 1:
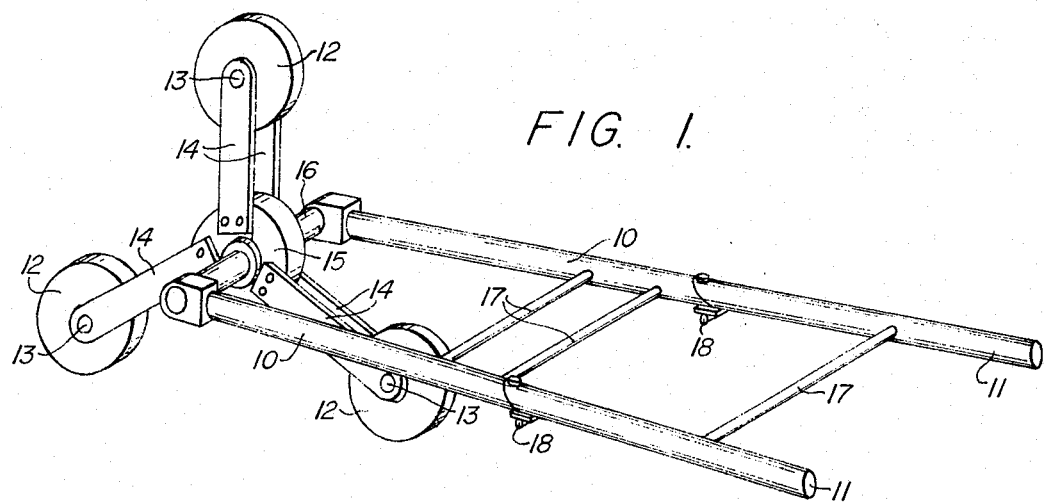
FIG. 1 is a perspective view of a load carrying device having a single set of three wheels.

In FIG. 1 the load carrying device is composed of a pair of elongated frame members 10 which may be solid or hollow. Tubular frame members are preferred for strength and lightness. Aluminum is the preferred metal for construction of the load carrying device inasmuch as some embodiments are intended to be light enough to be packed by one person across rugged terrain. The free ends 11 of frame members 10 serve as handles for pulling the device.

The frame members 10 of FIG. 1 are supported by a set of three wheels. These wheels 12 are preferably located in substantially the same vertical plane. The wheels rotate about axles 13 passing through support legs 14 near one end thereof which are attached at the opposite end thereof to a wheel 15 which serves to hold the legs in position and transfer the load to the main axle 16. The wheel 15 can be replaced by other constructions such as a fillet which hold the legs in their respective positions and which serves to form a bumper for easing the device across obstacles. Also shown in FIG. 1 are cross-braces 17 attached rigidly to the main frame members. The main frame members 10 may be hinged about a set of pins 18, preferably near the midpoint of the elongated frame members, so that the frame may be folded for easy carrying as part of a backpack. The hinge joint should be constructed so that the top of the frame folds downwardly. This construction enables loads to be supported on top of the frame without buckling of the frame.

The leg members 14 are preferably each about the same length and spaced apart an equal distance from the other two legs. The leg members can bear rotatably on the main axle or be attached to a central member, such as wheel 15, which rotatably bears on the main axle. The leg members are from about 12 to about 20 inches in length and preferably from about 14 to 18 inches in length.

The wheels generally have a diameter of from about 5 to about 10 inches with a diameter of 6 to 8 inches preferred.

The spacing between the brace 17 closest to the main axle and the main axle varies from about 15 to about 28 inches.

It is also preferred that the frame members at the open end be sufficiently small in circumference that they may be easily gripped by an adult person's hands; e.g., from about 1 to about 2 inches in diameter.

In transporting loads over very rough terrain, a single set of wheels is easier to move across the side of hills and over rocks, logs and the like. One wheel assembly of a dual assembly may strike a rock, causing rotation of the legs of that wheel assembly without the other wheel assembly rotating, thereby causing an unstable condition to occur. Also, an additional set of wheels adds to the weight of the device.

Figure 2:
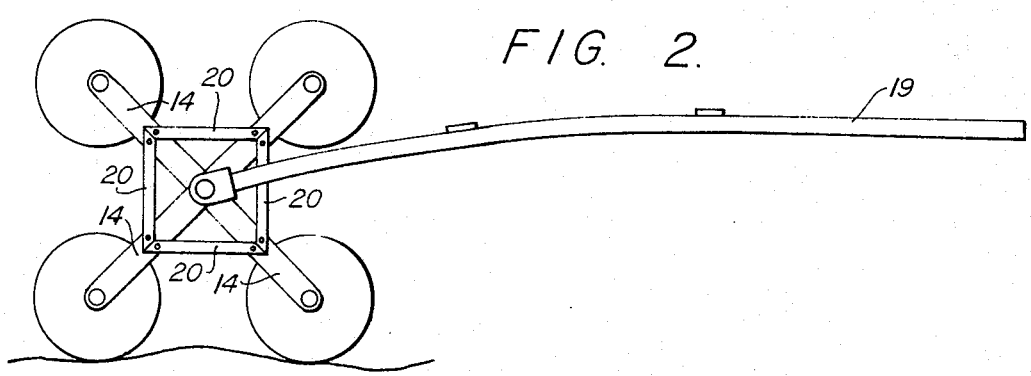
FIG. 2 is an elevational view of a load carrying device having curved frame members.

FIG. 2 illustrates additional embodiments of the instant invention. The frame members 19 of FIG. 2 are slightly curved in a convex shape. This aids somewhat in pulling the device across logs and other obstacles. It does result in the load being carried slightly higher from the ground which renders the device a little more difficult to balance than the device shown in FIG. 1. The frame members could, of course, be curved in the opposite direction to facilitate the balancing of the load during transporting of the load.

Also shown in FIG. 2 is a four wheel construction. The angle between adjacent legs 14 is 90°. However, the additional wheel adds weight and the distance between adjacent wheels is less, which causes the device to be less effective than the three wheel device in moving over large obstacles.

FIG. 2 also shows the legs 14 being braced and positioned by cross-arms 20. Any means of rigidly spacing the legs 14 is satisfactory. Some structural strength must be possessed by the cross-arms 20 to prevent buckling.

Figure 3:
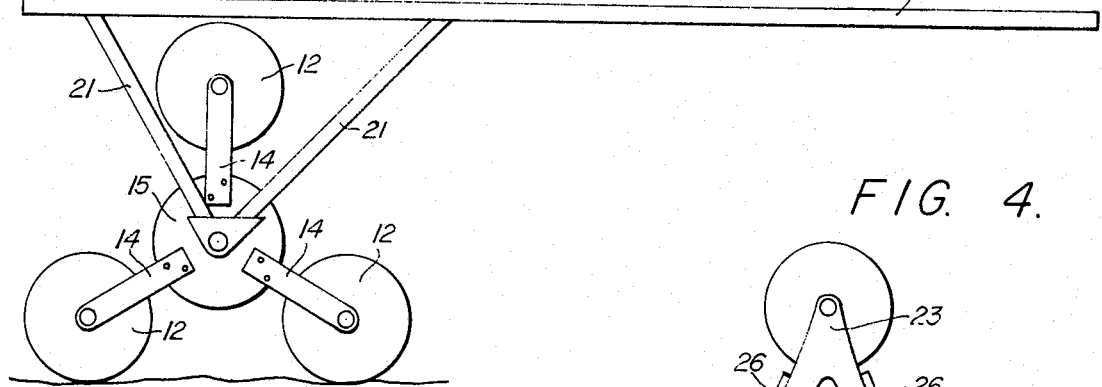
FIG. 3 is an elevational view of a load carrying device having a sub-frame support.

The apparatus shown in FIG. 3 has the load bearing frame transposed vertically above the wheels so that the wheels do not pass between frame members 10 when they rotate. A single set of wheels is attached to the axle by supporting legs as in the embodiments shown in FIGS. 1 and 2. The main axle is attached to the frame members 10 by structural supports 21. These structural supports 21 may be hinged to the frame members 10 so that they fold inwardly, assuming a flat position under frame when the main axle is removed. In place of hinges, the support members 21 may be pinned to the frame with removable pins.

The objective to be accomplished by hinging or pinning the support members 21 to the frame member 17 is to permit folding or removal of the supports so they can be positioned flat against the frame thereby enabling easy transportation of the apparatus.

The apparatus of FIG. 3 permits the load to be placed directly over the wheels, thereby enabling a greater load to be moved. The load, however, is higher above the ground than in the embodiments of FIGS. 1 or 2 and is more difficult to balance.

Figure 4:
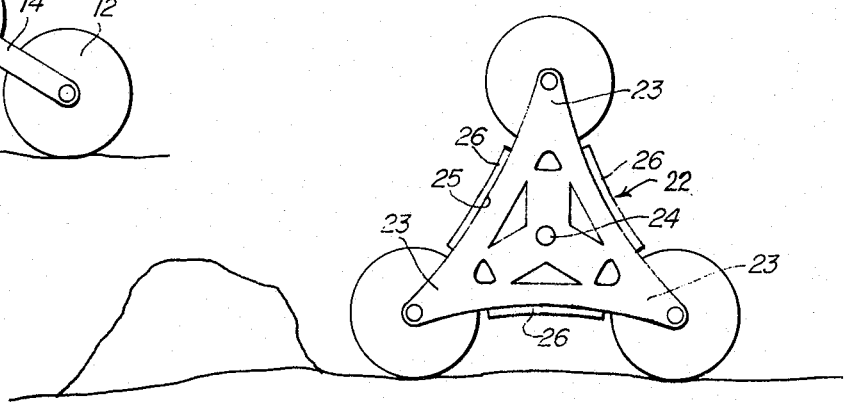
FIG. 4 is an elevational view of an alternative embodiment of a wheel assembly.

An alternative construction for affixing the wheels to the main axle is illustrated in FIG. 4. Instead of having three separate legs having means of holding them in relation to one another, a web 22 is provided which has three leg members 23 and a central bearing opening 24 for rotation about the main axle of the load carrying device.

The web member connects adjacent wheels by an arcuate section 25, preferably having bumper means 26 constructed of hard rubber, plastic or the like, to absorb some shock when the arcuate portion of the web strikes an obstacle, such as the rock illustrated in FIG. 4. It is generally preferred to have an obstacle contacting surface, such as arcuate section 25 and bumper 26, or the wheel 15 of FIG. 1, some 6 to 12 inches from the main axle so that a violent shock will not occur when one wheel strikes an obstacle and the wheel assembly rotates about the main axle so that another wheel falls from an elevated position to the ground, which could cause difficulty in handling the carrier if a heavy load is being carried.

In all of the above embodiments the main axle is easily removable so that the multi-wheeled structure can be laid flat on the frame and easily transported. The axle may be prevented from moving laterally by use of cotter keys, threaded ends with nuts attached or similar means. The wheeled elements consisting of wheels, supporting legs and bearing means, as shown in FIGS. 1, 2 and 3, is substantially centered on the main axle and is held in place by cotter keys, hollow shafts encompassing the main axle and extending from the wheeled element to the elongated frame members, and like means. The means for holding the wheeled element in a center position on the main axle should be easily removable. It is one of the objects of the present invention to provide a transportable carrier which is easily disassembled by hand or with the aid of only small hand tools. If the carrier is intended for commercial or home use where transportability is not a factor, then the carrier need not be easily disassembled.

As indicated hereinabove, the apparatus of this invention is especially adaptable for use by hikers, campers, hunters and the like in transporting heavy loads over rugged terrain. The apparatus can be constructed so that it is light, e.g., 15 to 30 pounds, and easily disassembled for carrying on one's back without undue effort. When assembled, the carrier can easily transport loads of hundreds of pounds, such as a deer carcass. The device may be readily moved across rugged terrain and can be effectively pulled over rocks, logs and the like. Although the device may be easily pushed across smooth terrain, best results are achieved over rugged terrain when the carrier is trailed behind the individual pulling it. The slightly upward direction of the pulling force aids the rotation of the wheeled element when the wheels on the ground become stuck against some object such as a rock or a log.

Although many embodiments have been described hereinabove, it is not intended that the invention be limited thereto, but to include all the modifications and variations falling within the scope of the appended claims.

I claim:

1. A lightweight load-carrying device for transporting heavy loads over rugged terrain comprising:
   a. a substantially flat, load-supporting frame having handle members at one end, said frame constructed of tubular members;
   b. a main axle supporting the frame at the end opposite said handle members;
   c. three load supporting legs of substantially the same length rotatably attached at one end of each of the legs to said main axle centrally between the ends thereof, said legs being substantially equiangularly spaced from one another, substantially perpendicular to the flat tubular frame and substantially on the center line of said flat, tubular frame;
   d. a wheel rotatably attached to the free end of each leg; and
   e. a fillet rigidly spacing adjacent pairs of legs.

2. The device of claim 1 wherein each leg is substantially 120° from the adjacent legs.

3. The device of claim 1 wherein said fillet is located near the midpoint of each leg.

4. The device of claim 3 wherein said fillet is a wheel member rotatably attached to said main axle.

5. The device of claim 1 wherein said flat, tubular frame comprises two elongated main tubular frame members having handle means at one end of each member and main axle support means at the ends opposite said handle means, said handle means ends spaced apart a greater distance than the ends supporting said main axle, said main frame tubular members interconnected and spaced by tubular bracing means, said tubular bracing means spaced a sufficient distance from said main axle support means to permit said legs with wheels attached to clear said bracing means.

6. The device of claim 5 wherein the elongated main tubular frame members are substantially straight between said handle means and said main axle support means.

7. The device of claim 6 wherein said elongated tubular frame members are hinged near the midpoint thereof to permit said main frame members to be folded to a position whereby said handle members are near said main axle support means.

8. The device of claim 5 wherein the main axle support means is spaced substantially perpendicularly from the tubular main frame members by a pair of elongated axle support members attached near the ends of said main frame members.

9. The device of claim 8 wherein said pair of elongated axle support members are hinged to said main frame members to permit folding of said axle support members substantially flat across said load supporting frame.

* * * * *